United States Patent [19]

Wadlington

[11] 3,917,963

[45] Nov. 4, 1975

[54] SAMPLING CIRCUIT

[75] Inventor: James Carroll Wadlington, Summit, N.J.

[73] Assignee: Bell Telephone Laboratories, Incorporated, Murray Hill, N.J.

[22] Filed: Aug. 21, 1973

[21] Appl. No.: 389,640

[52] U.S. Cl. ................. 307/254; 307/235; 307/296
[51] Int. Cl.² ........................................ H03K 17/00
[58] Field of Search.................... 307/254, 235, 296; 328/151; 332/12; 340/347 SH

[56] References Cited

UNITED STATES PATENTS

| | | | |
|---|---|---|---|
| 2,780,782 | 2/1957 | Bright | 332/12 |
| 2,937,342 | 5/1960 | Wellman | 332/12 |
| 2,952,785 | 9/1960 | Hodder | 307/254 |
| 2,970,227 | 1/1961 | Horton et al. | 307/254 |
| 2,970,308 | 1/1961 | Stringfellow et al. | 307/254 X |

FOREIGN PATENTS OR APPLICATIONS

| | | | |
|---|---|---|---|
| 1,502,299 | 10/1967 | France | 328/156 |

*Primary Examiner*—John S. Heyman
*Assistant Examiner*—B. P. Davis
*Attorney, Agent, or Firm*—H. L. Logan

[57] ABSTRACT

When using a switching device (such as a transistor) to sample a voltage, the device introduces an error voltage in the derived sample. In the present disclosure, a second switching device is used to produce a voltage which compensates for the error introduced by the first device.

4 Claims, 3 Drawing Figures

SAMPLING CIRCUIT

BACKGROUND OF THE INVENTION

1. Field of the Invention

This invention relates to circuits used for periodically sampling the amplitude of an analog signal.

2. Description of the Prior Art

Sampling circuits are used in many applications. They have been used, for example, in pulse code modulation (PCM) systems and in pulse-width modulated DC to DC converters. In general, such circuits are periodically enabled by a strobing clock signal to produce pulse outputs whose amplitudes are related to the amplitude of an analog signal at the time of the strobing. When, however, these circuits use a transistor or other switching device to sample the analog signal, a voltage drop across the switching device results in an error in the output pulse amplitudes. These errors are often of a magnitude to adversely affect the usefulness of the circuit output.

SUMMARY OF THE INVENTION

An object of the present invention is to compensate, in a sampling circuit, for the error voltage introduced by a transistor or other switching device.

This and other objects of the invention are achieved by using a second substantially identical switching device which adds a voltage of the correct amplitude and polarity to compensate for the error voltage introduced by the first switching device. In particular, the second switching device is connected in series with what would otherwise comprise the sampling circuit output terminals and is strobed in synchronism with the first switching device. Compensation is provided by poling the second device so that its voltage drop is opposite in polarity to the first device voltage drop as it appears in the sampling circuit output.

A feature of the present invention is that it may be practiced so that the DC energization necessary for operating the compensating device is restricted to the output portion of a sampling circuit. This is accomplished by transformer coupling the sampling circuit output into series combination with the voltage drop across the second switching device and, furthermore, transformer coupling the strobing signal to both switching devices. This isolation feature is particularly useful in pulse-width modulated DC to DC converters wherein it is desired to have directcurrent isolation between input and output grounds.

Still another feature of the invention is that such a converter may be constructed in which the input direct-current source may be used to power the entire converter.

DESCRIPTION OF THE DISCLOSED EMBODIMENT

Figure 1:
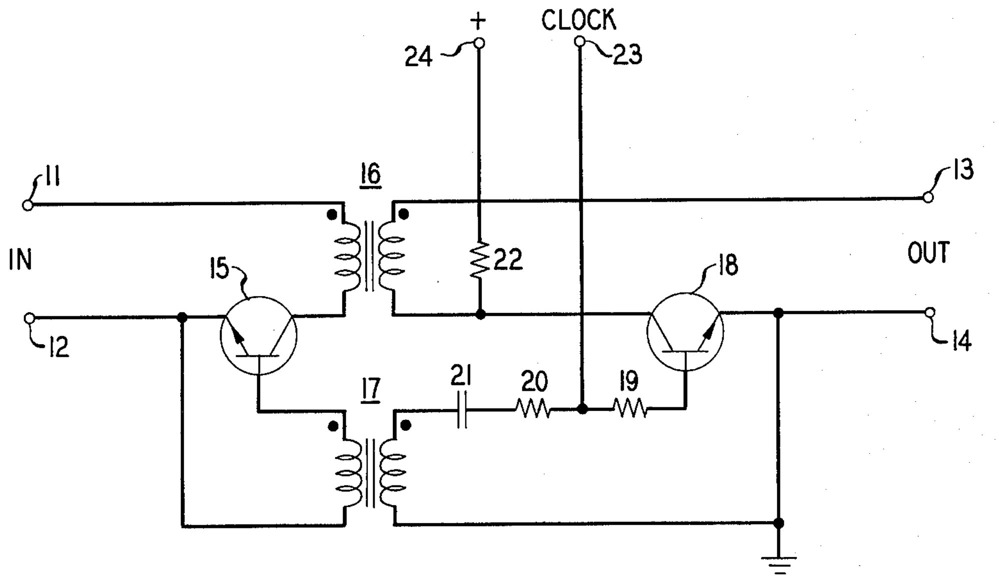
FIGS. 1 and 3 are schematic diagrams of embodiments of the invention.

The embodiment of FIG. 1 includes a pair of input terminals 11 and 12 and a pair of output terminals 13 and 14. The emitter of an NPN transistor 15 is connected to input terminal 12 while its collector is connected to input terminal 11 by way of the primary winding of a transformer 16 having a substantially one-to-one voltage coupling characteristic. The input side of the embodiment is completed by the base of transistor 15 being connected through the secondary winding of a transformer 17 to the emitter of the transistor. In use, the potential on terminals 11 and 12 is always such that conduction takes place through transistor 15 when it is forward-biased.

The circuit described thus far is substantially identical to the sampling circuit shown in FIG. 8 of U.S. Pat. No. 2,922,151 issued to P. A. Reiling on Jan. 19, 1960. When, however, the Reiling or the thus-far-described circuit is used as a sampling circuit, a voltage drop introduced by the conducting transistor frequently results in an unacceptable error. This may be better appreciated by considering the following expression for the voltage across the secondary winding of transformer 16 when a clock pulse is applied to the primary winding of transformer 17:

$$V_o = V_i - V_{ce15}$$

where:

$V_o$ = output amplitude across the secondary winding;
$V_i$ = input amplitude at the time of sampling; and
$V_{ce15}$ = collector-to-emitter voltage drop during time of sampling.

In accordance with the present invention, an emitter-to-collector path voltage drop across an NPN transistor 18 is added to the output across the secondary winding of transformer 16 to compensate for the error introduced by transistor 15. In particular, the collector-to-emitter path of transistor 18 is connected between one extremity of the secondary winding of transformer 16 and output terminal 14, while the other extremity of the secondary winding is connected to output terminal 13. The base of transistor 18 is serially connected through a first resistor 19, a second resistor 20, a capacitor 21, and the primary winding of transformer 17 to the emitter of transistor 18. The junction between the primary winding of transformer 17, the emitter of transistor 18, and output terminal 14 is connected to a point of ground potential. A resistor 22 is connected between a terminal 24 and the collector of transistor 18. In operation, a positive-with-respect-to-ground potential is applied to terminal 24. Finally, a terminal 23 is connected to the junction between resistors 19 and 20. In operation, positive-with-respect-to-ground clock pulses are applied to terminal 23.

When the circuit of FIG. 1 is strobed by a positive clock pulse on terminal 23, the pulse is applied to the base-to-emitter junction of transistor 18 and, via transformer 17, to the base-to-emitter junction of transistor 15. The windings of transformer 17 are poled so that the clock pulse forward-biases the base-to-emitter junction of transistor 15. As a result of this action, both transistors momentarily conduct. The voltage across the secondary winding of transformer 16 becomes ($V_i - V_{ce15}$). At the same time, there is a voltage drop of ($V_{ce18}$) across the collector-to-emitter junction of transistor 18. The windings of transformer 16 are poled so that this last voltage drop is added to the voltage across the secondary winding and the voltage at output terminals 13 and 14 becomes $$V_{oc} = V_i - V_{ce15} + V_{ce18}$$

where
$V_{oc}$ = output amplitude corrected.

By selecting substantially identical transistors, their collector-to-emitter voltage drops are substantially equal and the output amplitude is substantially equal to that of the analog voltage being sampled.

The embodiment of FIG. 1 is not restricted, as appreciated by those skilled in the art, to the use of NPN transistors. For a negative DC voltage and negative clock pulses, transistor 18 becomes a PNP transistor with the same electrode connections as shown in FIG. 1. Although it is desirable for compensation purposes that transistor 15 be of the same type as transistor 18, it may be of the opposite type. When it is of the opposite type, the polarity, as shown in FIG. 1, of one of the windings on each transformer must be reversed with respect to the polarity of the other winding.

In addition to the error compensation provided by the invention, it should be noted that direct-current isolation between the input and output terminals is also available. If such isolation is not required, transformer 17 may be eliminated. In such a case, terminals 12 and 14 are directly connected to one another and capacitor 21 is directly connected to the base of transistor 15 instead of transformer 17.

The input-output direct-current isolation feature of the invention is particularly useful in pulse-width modulated DC to DC converters. This may be appreciated by referring to FIG. 2 which shows, in block diagram form, a conventional pulse-width modulated DC to DC converter.

Figure 2:
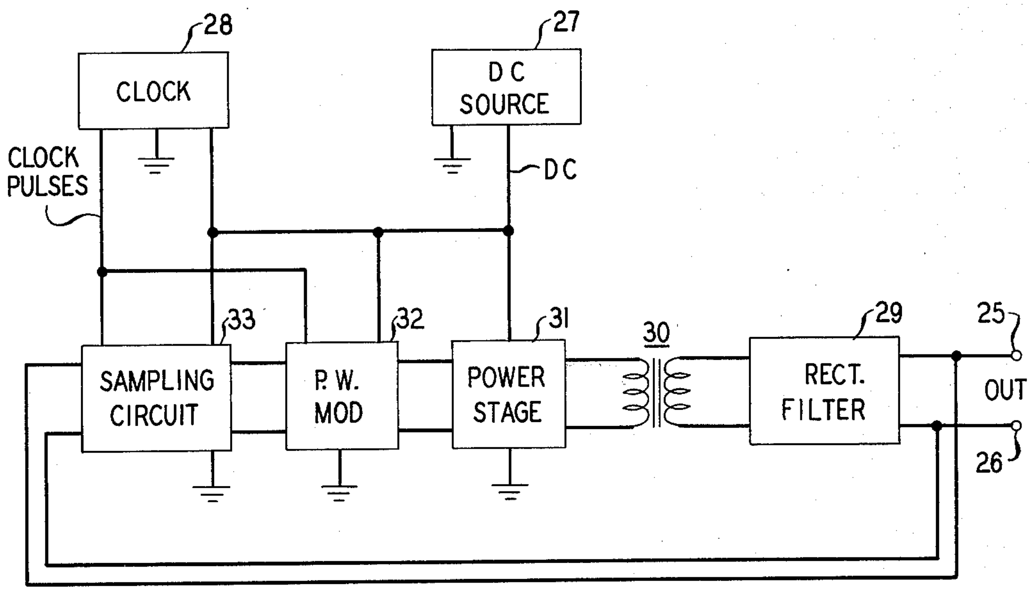
FIG. 2 is a block diagram of a pulse-width modulated DC to DC converter which may advantageously use the embodiments of the invention shown in schematic form in FIGS. 1 and 3.

FIG. 2 shows a pair of output terminals 25 and 26, a DC source 27, a clock 28, a rectifier and filter 29, a transformer 30, a power stage 31, a pulse-width modulator 32, and a sampling circuit 33. DC source 27 is connected to clock 28, power stage 31, modulator 32, and sampling circuit 33 so that all of these circuits are powered by the source. Clock 28 is connected to modulator 32 and sampling circuit 33 so that they are strobed by the clock pulses.

Sampling circuit 33 is connected to converter output leads 25 and 26. The sampling circuit therefore samples the converter output voltage level. The sample outputs from the sampling circuit are applied to modulator 32 which produces output pulses whose durations are inversely related to the amplitude of the sample outputs. The outputs from modulator 32 are power amplified in power stage 31 and then transformer coupled by transformer 30 to rectifier and filter 29. The output of the latter appears on terminals 25 and 26.

In a converter of this type, DC isolation between converter output terminals 25 and 26 and DC source 27 is frequently required. In the past this has been achieved by providing transformer coupling between the sampling circuit and the modulator or between the modulator and the power stage. With such an arrangement, however, a second DC source must be provided to power the sampling circuit and also the modulator if transformer coupling follows the modulator.

When using the embodiment of FIG. 1 in the converter of FIG. 2, DC input-output isolation is achieved without an additional transformer and an additional DC source. This is achieved because the embodiment provides input-output DC isolation at a point within the sampling circuit whereby the sampling circuit and modulator may be powered by the same source as the rest of the elements in the converter. The embodiment of FIG. 1 as shown may be used in FIG. 2 when source 27 produces a positive output voltage and clock 28 produces positive output pulses. In this case, the output terminals 25 and 26 are connected to input terminals 11 and 12 of FIG. 1 so that the more positive of the output terminals is connected to input terminal 11. When source 27 produces a negative output voltage and clock 28 produces negative output pulses, the embodiment of FIG. 1 may be used in FIG. 2 by directly replacing, as discussed earlier, the NPN transistors with PNP transistors.

Figure 3:
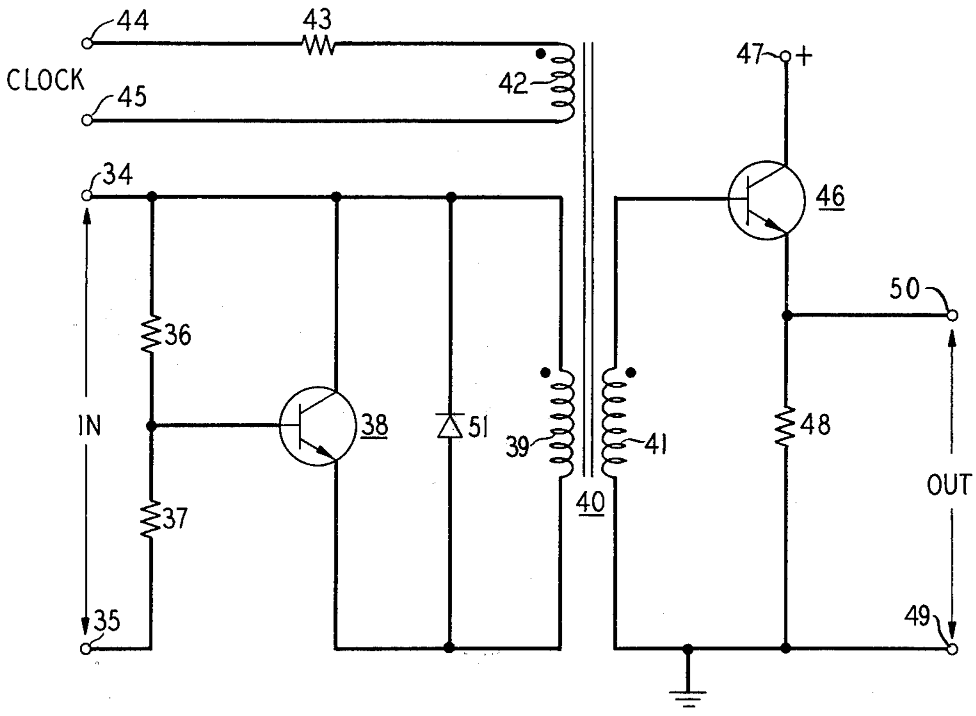

The embodiment of FIG. 3 includes a sampling circuit which comprises the subject matter of W. A. Peterson patent application Ser. No. 389,639, filed of even date herewith. This sampling circuit includes a pair of input terminals 34 and 35 with a pair of resistors 36 and 37 connected in series therebetween. The collector of a transistor 38 is also connected to terminal 34 while the base of the transistor is connected to the junction between the resistors. The collector and emitter of transistor 38 are connected to respective extremities of the primary winding 39 of a transformer 40. Transformer 40 has a secondary winding 41 having the same number of turns as primary winding 39. Still further, an auxiliary winding 42 and a resistor 43 are connected in series between a pair of clock, or strobe, terminals 44 and 45. The polarity of the three windings with respect to one another is indicated through the conventional use of a dot associated with one extremity of each winding.

In operation, the voltage to be sampled is applied between terminals 34 and 35. This voltage always has a polarity sense so that terminal 34 is positive with respect to terminal 35. The base-to-emitter junction of transistor 38 is therefore reverse-biased and the loading presented to terminals 34 and 35 is solely by resistors 36 and 37.

The clock, or strobe, pulses applied between terminals 44 and 45 drive terminal 44 positive with respect to terminal 45. Furthermore, these pulses induce voltages across winding 39 which, unless otherwise limited, exceed the maximum anticipated voltage across resistor 36 plus the base-to-emitter drop across transistor 38 when conducting. In operation, transistor 38 becomes active when the leading edge of an induced pulse reaches an amplitude equal to the voltage across resistor 36 plus the base-to-emitter drop of transistor 38 when conducting. At that time, the amplitude of the induced pulse becomes clamped to the voltage across resistor 36 plus the base-to-emitter voltage of transistor 38. Because of the transformer action, a pulse having an amplitude substantially equal to that across primary winding 39 is induced across secondary winding 41. The sample pulses appearing across secondary winding 41 are therefore substantially equal to a fixed portion of the input voltage plus the base-to-emitter voltage of transistor 38.

At the same time the voltage across winding 39 is clamped, the voltage across winding 42 is clamped with the difference between it and the clock pulse appearing across resistor 43. Resistor 43 is, of course, not necessary when the clock source has sufficient internal impedance.

The base-to-emitter voltage appearing in the sample pulses constitutes an error. In accordance with the invention, a second switching device in the form of an NPN transistor 46 is used to compensate for this error. In particular, the collector of transistor 46 is connected to a terminal 47; the base of transistor 46 is connected to one extremity of secondary winding 41; and the emitter of transistor 46 is connected through a resistor 48 to the other extremity of winding 41. The last-mentioned extremity of winding 41 is also connected to a point of ground potential and an output terminal 49. When is use, a positive-with-respect-to-ground potential is applied to terminal 47. A second output terminal 50 is connected to the junction between resistor 48 and the emitter of transistor 46.

In operation, the sample pulses across winding 41 forward-bias the base-to-emitter junction of transistor 46. Therefore, in addition to functioning as information conveyors, the sample pulses function as clock, or strobe, pulses to enable transistor 46, which operates as the second switching device. The voltage drop across the base-to-emitter junction of transistor 46 is substantially equal to the base-to-emitter voltage of transistor 38 when active but is opposite in polarity to the sample pulses across winding 41. The base-to-emitter voltage of transistor 46 therefore has a subtractive effect which causes the pulses appearing at output terminals 49 and 50 to be substantially equal in amplitude to the voltage across resistor 36, which in turn is proportional to the input voltage.

The invention as depicted in FIG. 3 is not, of course, restricted to the use of NPN transistors. In general, the remarks made with respect to FIG. 1 and the transistors usable therein apply equally as well to FIG. 3. Such alternatives are well appreciated by those skilled in the art.

It should be noted that in FIG. 1 a sample pulse is reduced by the collector-to-base drop of sampling transistor 15 while it is increased by the collector-to-base drop of compensating transistor 18. On the other hand, in FIG. 3 a sample pulse is increased by the base-to-emitter drop of sampling transistor 38 and reduced by the base-to-emitter drop of compensating transistor 46.

The embodiment of FIG. 3 may be used as sampling circuit 33 of FIG. 2 in the same manner as and with all the advantages of the embodiment of FIG. 1.

Finally, it may be found necessary in some embodiments to reset the cores of transformers 15 and 40 of FIGS. 1 and 3, respectively. This may be accomplished by connecting a diode across either the primary or secondary windings of these transformers. Such a diode and its connection is shown as diode 51 connected across primary winding 39 of transformer 40. The diode is poled oppositely with respect to transistor 38, thus permitting current conduction for resetting.

What is claimed is:

1. A sampling circuit comprising a pair of input terminals, a pair of output terminals, a first transistor, a transformer having a primary winding and a secondary winding, means connecting the collector and emitter of said first transistor to respective extremities of said primary winding, means connecting the base and collector of said first transistor between said input terminals, means connecting said secondary winding between said output terminals, and strobing means for inducing a flux field in said transformer, said circuit characterized in that:

said means connecting said secondary winding between said output terminals includes the base-to-emitter path of a second transistor; and means are connected to said second transistor to forward-bias its collector-to-emitter path.

2. A sampling circuit in accordance with claim 1 in which said means to forward-bias the collector-to-emitter path of said second transistor comprises:

a direct-current source;

a resistor; and means connecting said source to the collector of said second transistor and said resistor between said source and the emitter of said second transistor.

3. A sampling circuit comprising a first transistor connected in a transmission path between a pair of input terminals and a pair of output terminals, characterized in that:

a second transistor is connected in said transmission path;

biasing means comprising a resistor connected to form a series path with the collector-emitter path of said second transistor with said series path adapted for connection to a DC source to produce a collector current which flows in the normal direction when a base drive current less than said collector current is applied to said transistor;

said second transistor is connected in said transmission path so that the voltage drop thereacross in response to said base drive current is in opposition to the voltage drop across said first transistor in response to a base drive current applied thereto; and means for simultaneously applying said base drive currents to said first and second transistors.

4. A sampling circuit in accordance with claim 3 further characterized in that:

a transformer is connected in said transmission path to provide transformer coupling between first and second portions of said transmission path where said first portion includes said first transistor and said second portion includes said second transistor and biasing means.

* * * * *